United States Patent Office 2,758,176
Patented Aug. 7, 1956

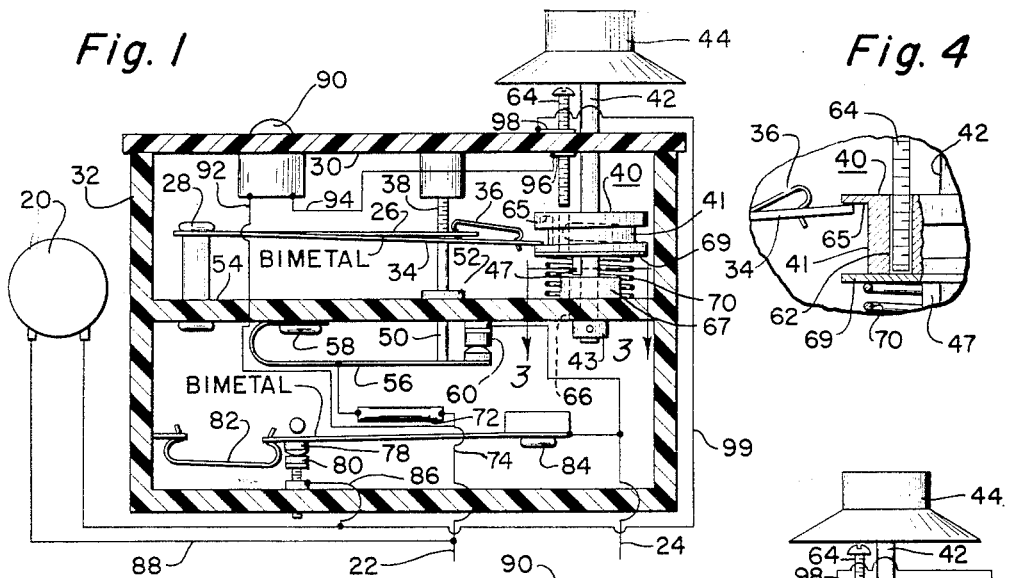
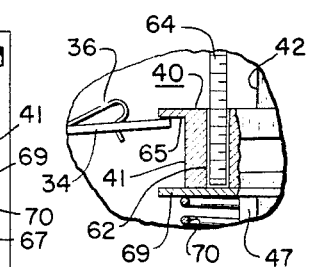
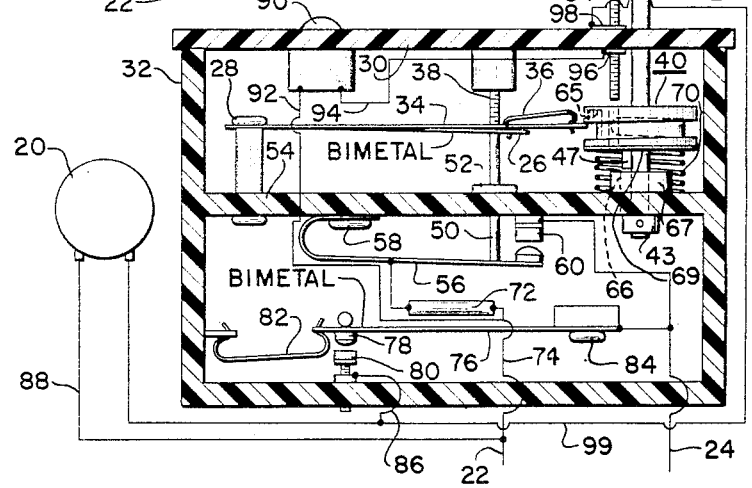
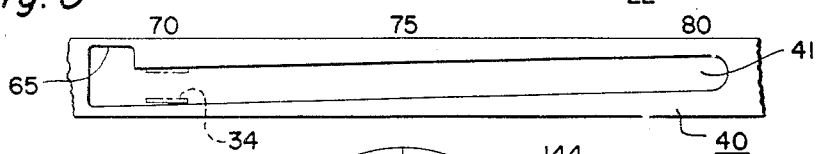
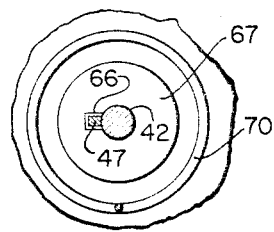
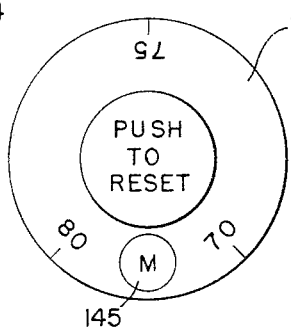

2,758,176

ELECTRICAL APPARATUS

Marshall C. Harrold, Dayton, Ohio, assignor to General Motors Corporation, Detroit, Mich., a corporation of Delaware Application June 12, 1953, Serial No. 361,206

10 Claims. (Cl. 200—136)

This invention relates to control devices for electrical apparatus.

The National Electrical Manufacturers Association and the Edison Electric Institute have placed certain restrictions on the installation of single phase motors.

Rule 1.—Automatically controlled, single-phase motorized equipment designed for general use shall be equipped with motors having locked-rotor currents at rated voltage designed not to exceed the following:

(a) 20 amp. at 115 v.;
(b) 25 amp. at 230 v. A tolerance of +15 per cent of these current values taken at 25° C. is acceptable in testing any individual motor. NOTE: Exceptions may be made for automatically started equipment whose operating cycles will normally involve long runs with infrequent starting.

Rule 2.—Manually-controlled, single-phase motorized equipment designed for general use shall be equipped with motors having locked-rotor currents at rated voltage designed not to exceed the following:

(a) 40 amp. at 115 v.;
(b) 50 amp. at 230 v. A tolerance of +15 per cent of these current values, taken at 25° C., is acceptable in testing any individual motor.

It is therefore an object of my invention to provide a thermostatic control which is always temperature stopped but which may be locked to require manual starting or unlocked to permit thermostatic starting.

It is another object of my invention to provide a thermostatic control in which a simple selector arrangement is provided for thermostatic stopping and either manual or thermostatic re-starting.

It is another object of my invention to provide a control which can be readily changed to provide either automatic control or manual control under either the first or second rules above.

In the form illustrated, these objects are attained by providing a bimetal operated toggle switch mechanism having its limits of movement controlled by a grooved cylindrical cam to control both the opening and closing temperatures except in one position. One stop surface of said groove is spaced sufficiently from the closed position stop that the toggle cannot be returned automatically to the closed circuit position. The rotatable stop in this manual reset position is movable axially for moving the toggle device across dead center for manual resetting. The other stopping surfaces permit thermostatic resetting at various temperatures. A spring is provided for automatically returning the rotatable stop member from the reset position to the manual reset stopping position.

A thermostatic relay is used to operate the main switch contacts and an indicating light is arranged to indicate when the electric circuit is disconnected only with the rotatable stop member in the manual position. A locking screw is provided for locking the rotatable stop member by projecting into an aperture to limit the cylindrical cam to axial movement between the manual and reset positions only so that it will satisfy the conditions of Rule 2. When the screw is removed from the control the signal light is disconnected from the circuit and the rotatable stop member may be turned to various temperature positions in which the toggle switch mechanism will reclose at the selected temperature.

Further objects and advantages of the present invention will be apparent from the following description, reference being had to the accompanying drawings wherein a preferred form of the invention is clearly shown.

In the drawings:

Figure 1 is a vertical sectional view of a control shown in the closed position embodying one form of my invention;

Figure 2 is a view similar to Figure 1 with the control shown in the open circuit position;

Figure 3 is a fragmentary horizontal sectional view taken along the line 3—3 of Figure 1 with the selector in the thermostatic reset position;

Figure 4 is a fragmentary vertical sectional view of the cylindrical cam and bimetal control with the cam and selector in the manual position;

Figure 5 is a development showing the contour of the cylindrical cam groove; and Figure 6 is a view of a modified indicator arrangement.

Referring now to the drawings and more particularly to Figure 2, there is shown an electrical device such as an electric motor 20 to be controlled. This electric motor 20, for example, may be used to operate an air conditioning system which under normal conditions will operate continuously for long periods of time under thermostatic control. This makes it possible for electric supply companies to make an exception for this apparatus under Rule 1. The motor 20 is supplied from the supply conductors 22 and 24.

To control the operation of the motor there is provided a cantilever bimetal strip or tongue 26 anchored to the anchorage 28 within the upper chamber 30 of the enclosure 32. Surrounding this bimetal strip or tongue 26 is a U-shaped thin metal spring member 34 likewise anchored in cantilever fashion to the anchorage 28. A C-shaped toggle spring 36 is provided between the end portion of the bimetal strip 26 and the inner edge of the adjacent end portion of the U-shaped spring strip 34. This provides a toggle mechanism of the general type illustrated in the Carlson Patent 2,068,374 which may be referred to for further illustration. It, however, is merely one example of thermostatically operable toggle devices capable of opening and closing a switch mechanism or other control devices in a suitable arrangement for carrying out my invention.

In Figure 1 the C-shaped toggle spring 36 tends to spread the bimetal tongue 26 and the U-shaped spring strip 34 so that the tongue 26 rests against the adjustable stop screw 38 while the extreme end of the U-shaped strip 34 rests upon the nearest stop surface of a rotatable stop cam 40 which is mounted upon the inner end of a rotatable shaft 42. This shaft 42 is rotatably mounted in the top and middle walls of the enclosure 32 and at its outer end carries an adjusting knob 44 provided with a dial skirt.

As shown in Figures 1 and 2, the knob 44 and the rotatable stop member 40 are in the rotational position corresponding to a 70° switch closing temperature. The cam 40 is provided with a helical stopping groove 41 providing opposed stopping surfaces extending from the point where the U-shaped strip 34 contacts it as shown in Figure 5 in a counter-clockwise direction to the opposite closed end. Consequently, as the rotatable stop cam 40 is turned to the higher temperature indications in the clockwise direction as viewed from the top of Figure 1, the end of the U-shaped strip 34 is raised and moved nearly to the line of its anchorage so that the bimetal 26 will not be required to attain as low a temperature before the toggle arrangement will snap to the open position.

The open position of the toggle arrangement is shown in Figure 2 with the free end of the U-shaped thin spring strip 34 shown against the top surface of the groove 41 and the bimetal tongue 26 away from its stop screw 38. The toggle arrangement moves from the position shown in Figure 1 to the position shown in Figure 2 with a snap action. The C-shaped toggle spring 36 has a sufficiently low rate so that the toggle arrangement will move without creeping directly from one position to another at an increasing rate whenever a sufficient force is developed in the bimetal tongue 26. In the position shown in Figure 2 the bimetal tongue 26 has engaged and pushed down an operating pin 50 which is vertically slidable in a bushing 52 upon the dividing wall 54 in the enclosure 32.

As shown in Figure 2 the pin 50 has engaged and holds a switch mechanism which includes a hooked shaped thin metal spring 56 having its hooked shaped end anchored to the anchorage 58 on the dividing wall 54. The free end of the strip 56 is provided with a contact for making engagement with a stationary contact 60 also mounted on the dividing wall 54.

When the bimetal 26 in the position shown in Figure 2 becomes sufficiently warm according to the temperature set by the adjustment of the knob 44, the toggle arrangement will snap to the position shown in Figure 1 thereby releasing the pin 50 and allowing the spring strip 56 to move its contact into engagement with the stationary contact 60 because of its inherent spring bias to its closed position. To raise the opening and closing temperatures, the rotatable stopping cam 40 has a helical groove 41 with the side walls of the groove forming stopping surfaces for the end of the U-shaped strip 34. As the stop cam 40 is turned in the clockwise direction as viewed in Figure 3 the free end of the strip 34 in the position shown in Figure 2 is raised to raise the switch opening and closing temperatures. The various temperatures indicating positions are shown on the dial skirt of the knob 44. In these positions, the control operates thermostatically at all times and opens when a predetermined low temperature is reached and closes when a predetermined high temperature is reached under the control of the cam 40.

A suitable arrangement is provided for restricting the device so that it will come under Rule 2. According to this invention, the arrangement is such that the switch cannot reclose automatically. It must be closed manually and open thermostatically when a predetermined low temperature is reached. For this purpose the stop cam 40 is provided with a drilled hole 62 parallel but eccentric to the knob shaft 42. When it is desired to limit the control to manual operation, the service man will turn the knob 44 to the manual position "M" placing the drilled hole 62 directly in alignment with the long screw 64. The screw 64 is then threaded into the drilled hole 62 by the service man. This prevents the rotation of the cam 40 but does not prevent its axial movement. In this position the free end of the strip 34 operates in a portion of the groove 41 where there is a recess 65 in the top wall which allows an abnormal upward movement of the strip 34. In this position, the snap acting arrangement can move by thermal action only from the position shown in Figure 1 to the position shown in Figure 4. The increased angle of the C-shaped toggle spring 36 in Figure 4 provides a greater force preventing the return of the bimetal 26 to the position shown in Figure 1 than is required for the return from the position shown in Figure 2. This force preventing the return of the bimetal 26 is great enough that it can only be returned manually to the switch closing position. It is prevented from returning by thermal action from the position shown in Figure 4 to the position shown in Figure 1 by reason of the fact that the recess 65 allows the toggle spring 36 to tilt to such an angle that the ends of the strip 34 and the tongue 26 are spread so far apart that the bimetal tongue 26 does not have sufficient power to accomplish the switch closing movement.

To accomplish the switch closing movement, the cam 40 is pushed downwardly by pushing down the knob 44 while in the position "M" on the dial skirt of the knob 44. In this downward movement from the position shown in Figure 4, the strip 34 is moved downwardly sufficiently close to the dead center position that the bimetal tongue 26 can readily actuate the snap-action mechanism to the closed circuit position shown in Figure 1. Preferably there is provided a coil spring 70 extending between a rotatable disc 69 on the bottom of the cam 40 and the adjacent side wall of the enclosure 32 tending to hold the cam 46 in its normal upper position and to automatically return the cam 40 to the normal position after the bimetal 26 has been reset.

The lower end of the knob shaft 42 extends through a keyhole shaped aperture 66 extending through a boss 67 and the partition wall 54. To limit the upward movement of the knob 44, the shaft 42 and the cam 40, the lower end of the knob shaft 42 is provided with a collar 43 which normally bears against the bottom of the partition wall 54. To prevent the knob 44 from being pushed inwardly except when in the manual reset position, the knob shaft is provided with a key 47 located just above the boss 67 when the shaft 42 is in its normal position shown in Figures 1 and 2. The slot of the keyhole shaped aperture 66 is oriented with the screw 64 and the key 47 is oriented with respect to the recess 65 of the cam 40 so that the key 47 will enter the aperture 66 only in the the manual reset position of the knob 44. In all other positions, the boss 67 will stop the downward movement of the key 47 and the knob shaft 42.

The supply conductor 24 connects directly to the contact 60. The thin metal spring contact 56 is not relied upon to break the current to the motor 20 but it is connected to a heater 72 which in turn is connected by the conductor 74 to the other supply conductor 22. When the contact 60 is engaged by the spring contact 56, the circuit is closed through the heater 72 so that it heats the bimetal 76 so as to move its contact 78 into engagement with the adjustable normally stationary contact 80. The operation of the bimetal 76 is controlled by the snap-acting toggle spring 82 so that it moves to open and closed position with a snap-action. The bimetal 76 is anchored to the anchorage 84 which is connected directly to the supply conductor 24. The contact 80 is connected by the conductor 86 to the motor 20 which is connected by the conductor 88 to the supply conductor 22. The heater 72 is energized whenever the spring contact 56 is in the closed position as shown in Figure 1 to heat the bimetal 76 to cause it to move to the closed position shown in Figure 1 to energize the motor 20. Whenever the spring contact member 56 moves to the open position as shown in Figure 2, the heater 72 is deenergized allowing the bimetal 76 to snap to the open position.

It is desirable to provide an indicating means to indicate whenever the circuit is closed and open when the control is in the manual operating position. For this purpose there protrudes from the enclosure 32 a signal light 90 having one terminal connected by the conductor 92 to the supply conductor 24. The other terminal is connected by the conductor 94 to a threaded plate 96 beneath the top wall of the enclosure 32 at the location of the screw 64. The top of the enclosure is provided with a similar threaded plate 98 which is connected by the conductor 99 to the conductor 86 leading to the motor circuit. When the screw 64 is threaded through the threaded plates 96 and 98 into the position for manual operation or in the position shown in Figures 1 and 2, it will close the circuit between the plates 96 and 98 to permit the light 90 to be energized whenever the switch 56—60 is open. When the screw 64 is removed for thermostatic operation, the light 90 will be disconnected from the supply conductor 22. The circuit for the light 90 is connected in shunt with both the contacts 56—60 and the contacts 78 and 80 and whenever these contacts are opened and the screw 64 is in place the light 90 will be illuminated. If the light 90 goes out, this indicates that the knob 44 requires resetting if it is in the manual position. However, the light 90 is not operated for complete thermostatic operation. Whenever the screw 64 is withdrawn from the plates 96 and 98, the circuit is opened to prevent energization of the light 90.

In Figure 6 there is shown an arrangement wherein a modified form of dial knob 144 is provided with a window 145 on which is marked the letter "M." The light 90 is placed directly behind this window 145. With this arrangement the plates 96 and 98 can be eliminated since the light will be concealed in all positions of the dial except the manual position "M." When the dial 144 is in the manual position "M," the light 90 will be lighted behind the window 145 as long as the circuit is closed to the motor 20. When the circuit of the motor 20 is opened the light 90 will be extinguished and the window 145 will be dark. This will indicate that the knob 144 must be pushed in to the reset position in order to restart the motor 20.

It will, therefore, be seen that I have provided a simple control which without any complications can be made to operate either as a thermostatically operated opening and closing switch or as a manual reclosing thermostatic opening switch. This will provide a versatile control capable of being used with different types of motors and apparatus arranged so that it may be used as either a Rule 1 or Rule 2 control as promulgated by the National Electrical Manufacturers Association and the Edison Electric Institute.

I have also provided a low cost reliable thermal relay having a high current carrying capacity rating which may be readily operated by a sensitive control element having a low current carrying capacity rating.

While the form of embodiment of the invention as herein disclosed constitutes a preferred form, it is to be understood that other forms might be adopted as may come within the scope of the claims which follow.

What is claimed is as follows:

1. A thermostat including a temperature responsive means, a toggle means operatively connected to said temperature responsive means, a control device operatively connected to one of said means for operation from one control position to another, a movable multiple stop arrangement for said toggle means having one definite position allowing such an extensive free movement of the toggle means that the control device under normal temperature conditions cannot return to its original position under the force of the temperature responsive means, said movable stop arrangement having another position providing a reduced amount of free movement sufficient that the control device under normal temperature conditions will return to its original position under the force of the temperature responsive means.

2. A thermostat including a temperature responsive means, a toggle means operatively connected to said temperature responsive means, a control device operatively connected to one of said means for operation from one control position to another, a movable multiple stop arrangement for said toggle means having one definite position allowing such an extensive free movement of the toggle means that the control device under normal temperature conditions cannot return to its original position under the force of the temperature responsive means, said movable stop arrangement having another position providing a reduced amount of free movement sufficient that the control device under normal temperature conditions will return to its original position under the force of the temperature responsive means, said movable stop arrangement having a reset position for moving said toggle means a sufficient distance toward its original position to cause it to continue to its original position.

3. A thermostat including a temperature responsive means, a toggle means operatively connected to said temperature responsive means, a control device operatively connected to one of said means for operation from one control position to another, a movable multiple stop arrangement for said toggle means having one definite position allowing such an extensive free movement of the toggle means that the control device under normal temperature conditions cannot return to its original position under the force of the temperature responsive means, said movable stop arrangement having an other position providing a reduced amount of free movement sufficient that the control device under normal temperature conditions will return to its original position under the force of the temperature responsive means, said movable stop arrangement having a reset position for moving said toggle means a sufficient distance toward its original position to cause it to continue to its original position, and spring means for moving said stop means from said reset position to said one definite position.

4. A thermostat including a temperature responsive means, a toggle means operatively connected to said temperature responsive means, a control device operatively connected to one of said means for operation from one control position to another, a movable multiple stop arrangement for said toggle means having one definite position allowing such an extensive free movement of the toggle means that the control device under normal temperature conditions cannot return to its original position under the force of the temperature responsive means, said movable stop arrangement having another position providing a reduced amount of free movement sufficient that the control device under normal temperature conditions will return to its original position under the force of the temperature responsive means, and locking means for preventing the movement of said stop arrangement to said another position.

5. A thermostat including a temperature responsive means, a toggle means operatively connected to said temperature responsive means, a control device operatively connected to one of said means for operation from one control position to another, a movable multiple stop arrangement for said toggle means having one definite position allowing such an extensive free movement of the toggle means that the control device under normal temperature conditions cannot return to its original position under the force of the temperature responsive means, said movable stop arrangement having another position providing a reduced amount of free movement sufficient that the control device under normal temperature conditions will return to its original position under the force of the temperature responsive means, said movable stop arrangement having a reset position for moving said toggle means a sufficient distance toward its original position to cause it to continue to its original position, and locking means having an ineffective position and an effective interlocking movement restricting position for limiting said stop arrangement to said one definite position and said reset position.

6. A thermostat including a temperature responsive means, a toggle means operatively conected to said temperature responsive means, a control device operatively connected to one of said means for operation from one control position to another, a movable multiple stop arrangement for said toggle, means including a rotatable stop means having one rotational position presenting a retracted stopping surface sufficiently retracted from the toggle means to prevent the return of the control device to its original position under the force of the temperature responsive means during normal temperature conditions, said rotatable stop means having a second rotational position presenting a projected stopping surface limiting the movement of the toggle means more than said retracted surface to cause the toggle means to be returned to its original position under the force of said temperature responsive means during normal temperature conditions.

7. A thermostat including a temperature responsive means, a toggle means operatively connected to said temperature responsive means, a control device operatively connected to one of said means for operation from one control position to another, a movable multiple stop arrangement for said toggle means having one position of rotation providing one set of stopping surfaces positioned sufficiently close together to permit the temperature responsive means to operate the toggle means from either limit of movement to the other and a second position of rotation providing a second set of stopping surfaces positioned farther apart than said one set to prevent the temperature responsive means from operating the toggle means from one position to another under normal temperature conditions, and means for preventing the rotational movement of said stop arrangement from said second position.

8. A thermostat including a temperature responsive means, a toggle means operatively connected to said temperature responsive means, a control device operatively connected to one of said means for operation from one control position to another, a movable multiple stop arrangement for said toggle means having one position of rotation providing one set of stopping surfaces positioned sufficiently close together to permit the temperature responsive means to operate the toggle means from either limit of movement to the other and a second position of rotation providing a second set of stopping surfaces positioned farther apart than said one set to prevent the temperature responsive means from operating the toggle means from one position to another under normal temperature conditions, and manually operable means effective in said second position for moving said toggle means from one position to another.

9. A thermostat including a temperature responsive means, a toggle means operatively connected to said temperature responsive means, a control device operatively connected to one of said means for operation from one control position to another, a movable multiple stop arrangement for said toggle means having one position of rotation providing one set of stopping surfaces positioned sufficiently close together to permit the temperature responsive means to operate the toggle means from either limit of movement to the other and a second position of rotation providing a second set of stopping surfaces positioned farther apart than said one set to prevent the temperature responsive means from operating the toggle means from one position to another under normal temperature conditions, and means for preventing the rotational movement of said stop arrangement from said second position, and means for moving said stop arrangement in the direction of the axis of rotation for moving said toggle means from one position to another.

10. A thermostat including a temperature responsive means, a toggle means operatively connected to said temperature responsive means, a control device operatively connected to one of said means for operation from one control position to another, a movable multiple stop arrangement for said toggle means having one definite position allowing such an extensive free movement of the toggle means that the control device under normal temperature conditions cannot return to its original position under the force of the temperature responsive means, said movable stop arrangement having another position providing a reduced amount of free movement sufficient that the control device under normal temperature conditions will return to its original position under the force of the temperature responsive means, and locking means for preventing the movement of said stop arrangement to said another position, a signal light and circuit connected in controlling relationship with said control device, and switch means located in series with said signal light and interlocked with said locking means to be closed when said locking means is in position and opened upon removal of the locking means.

References Cited in the file of this patent

UNITED STATES PATENTS

| | | |
|---|---|---|
| 1,928,484 | Getchell | Sept. 26, 1933 |
| 2,133,888 | Bloch | Oct. 18, 1938 |
| 2,384,372 | Eaton | Sept. 4, 1945 |
| 2,385,606 | Campbell | Sept. 25, 1945 |
| 2,452,508 | Ulanet | Oct. 26, 1948 |